(12) United States Patent
Deguchi et al.

(10) Patent No.: US 6,190,282 B1
(45) Date of Patent: Feb. 20, 2001

(54) CONTROL DEVICE FOR HYBRID VEHICLE

(75) Inventors: Yoshitaka Deguchi, Yokosuka; Kazuma Okura, Yokohama; Yasuhiko Kitajima, Zushi; Susumu Komiyama, Yokohama, all of (JP)

(73) Assignee: Nissan Motor Co., Ltd., Yokohama (JP)

( * ) Notice: Under 35 U.S.C. 154(b), the term of this patent shall be extended for 0 days.

(21) Appl. No.: 09/205,233

(22) Filed: Dec. 4, 1998

(30) Foreign Application Priority Data

Dec. 5, 1997 (JP) .................................................... 9-335867

(51) Int. Cl.[7] .............................. B60K 41/02; B60K 1/00
(52) U.S. Cl. ................................. 477/5; 477/174; 180/65.2
(58) Field of Search .................................. 477/5, 11, 12, 477/14, 174, 175, 178, 180, 181

(56) References Cited

U.S. PATENT DOCUMENTS

| | | | | |
|---|---|---|---|---|
| 4,335,429 | * | 6/1982 | Kawakatsu | 180/65 A X |
| 5,327,992 | * | 7/1994 | Boll | 180/65.2 |
| 5,359,308 | * | 10/1994 | Sun et al. | 180/65.2 X |
| 5,775,449 | * | 7/1998 | Moroto et al. | 477/5 X |
| 5,842,534 | * | 12/1998 | Frank | 180/65.2 |
| 5,929,608 | * | 7/1999 | Ibaraki et al. | 322/16 |
| 5,993,351 | * | 11/1999 | Deguchi et al. | 477/174 X |
| 6,009,365 | * | 12/1999 | Takahara et al. | 477/118 X |
| 6,048,289 | * | 4/2000 | Hattori et al. | 477/5 X |

* cited by examiner

Primary Examiner—Charles A Marmor
Assistant Examiner—Roger Pang
(74) Attorney, Agent, or Firm—Foley & Lardner (57) ABSTRACT

The present invention is proposed to avoid the generation of shocks when the output of an engine is switched with that of an electric motor connected by a clutch. The invention comprises a first electric motor connected mechanically to an engine and a second electrical motor connected mechanically through a clutch to an engine. The drive force is transmitted to the drive wheel through a transmission from the second electric motor. It is decided whether or not to connect the clutch on the basis of driving conditions. When it is decided to connect the clutch, the engine is controlled so that the output of the engine meets the required force. The first electric motor functions as an electric generator so that the rotation speed of the engine reaches a target rotation speed. When the engine is rotating at a target rotation speed, the clutch is connected. In this way, shocks are avoided when the clutch is connected and improved driving performance is realized.

13 Claims, 6 Drawing Sheets

CONTROL DEVICE FOR HYBRID VEHICLE

FIELD OF THE INVENTION

The present invention relates to a control device for a hybrid vehicle which uses an engine and an electric motor as a motive source for the vehicle.

BACKGROUND OF THE INVENTION

A hybrid vehicle which uses an engine and an electric motor as the motive source for a vehicle is known.

This type of hybrid vehicle uses the output of the electric motor when the running load is small and switches to the output of the engine from the electric motor when the load is large. The engine and the electric motor are connected by a clutch. When the clutch is connected and the switch is made from the electric motor to the engine, a shock is generated on switching if there is a difference between the two outputs. Thus driving performance and driver comfort are adversely affected.

For example, when a vehicle accelerates from a low speed, a clutch is connected for the purpose of switching from driving on the electric motor to driving on the engine. At this time, the output of the engine is made to correspond with that of the electric motor before the engagement of the clutch so that a shock will not be generated at the time of switching. Furthermore it is necessary to place the output of the electric motor to zero at the moment that the clutch is connected. Actually since there is a response delay, this kind of control is not possible and the generation of a shock can not be avoided. Furthermore if there is a difference in the rotation speed between the engine and electric motor at the moment the clutch is engaged, not only will a shock be generated, but also the clutch will undergo wear.

SUMMARY OF THE INVENTION

The object of the present invention is to avoid the generation of shocks when a clutch is engaged on switching from the output of an electric motor to that of an engine.

To achieve the above object the invention provides a control device for a hybrid vehicle which comprises an engine, a first electric motor connected to the engine, a second electric motor connected through a clutch to the engine, a transmission which transmits a motive force to a drive system and which is connected to the second electric motor, and a microprocessor which is programmed to decide whether or not to connect said clutch on the basis of driving conditions, to detect a required motive force of the vehicle, and to limit an output of the engine or an output of the second electric motor to meet the required motive force.

The microprocessor is further programmed when it is decided to connect the clutch, to control switching so as to control the engine so that an output of the engine reaches the required motive force to control the first motor so that an output of the engine is absorbed and a rotation speed reaches a target rotation speed, to control the clutch so that the clutch is connected after the engine rotation speed corresponds with a target rotation speed.

The above and other objects, features and advantages of the invention will become apparent from reading of the following detailed description of the preferred embodiments taken in conjunction with the accompanying drawings.

DETAILED DESCRIPTION OF THE EMBODIMENTS

The present embodiment is applied to hybrid vehicles, for example, series parallel hybrid vehicles which run on a electric motor at times of low load and on an internal combustion engine at times of high load.

Figure 1:
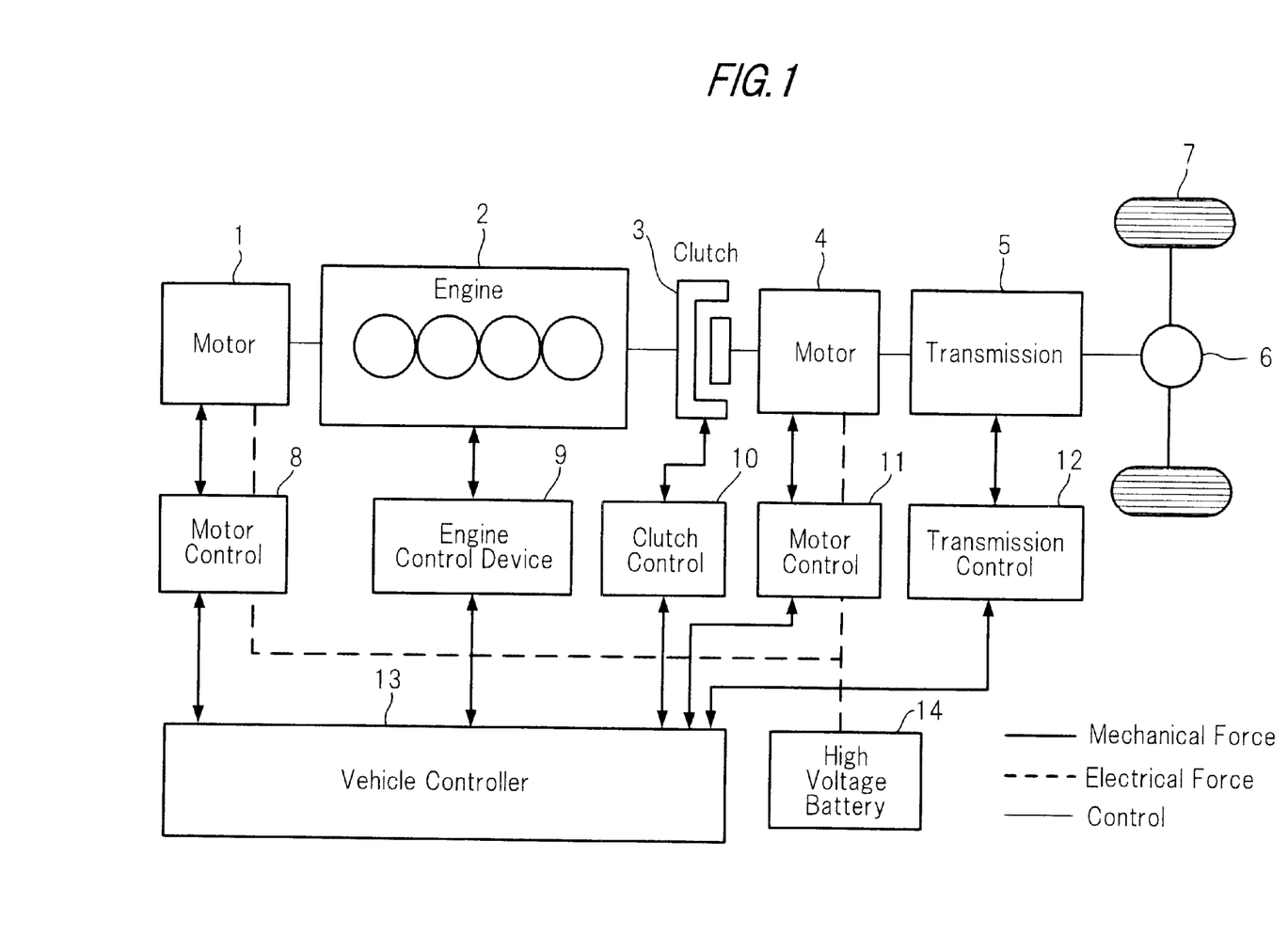
FIG. 1 shows the layout of an embodiment of the present invention.

FIG. 1 shows the layout of the present invention. The thick solid line shows the transmission circuit of mechanical force, the broken line shows the transmission circuit of electrical force and the thin line shows the control line.

The power train of the vehicle is comprised of a first electric motor 1, an engine 2, a clutch 3, a second electric motor 4, a transmission 5, and a motive transmission mechanism 6. The output shaft of the electric motor 1, the output shaft of the engine 2 and the input shaft of the clutch 3 are mutually connected. The output shaft of the clutch 3, the output shaft of the electric motor 4 and the input shaft of the transmission 5 are also mutually connected. When the clutch 3 is engaged, the electric motor 1, the engine 2 and the electric motor 4 are capable of acting as the motive source of the vehicle. When the clutch 3 is released, only the electric motor 4 is capable of acting as the motive source of the vehicle.

It is possible to use an AC induction motor, an AC synchronous motor or a DC motor as the electric motor 1,4. The electric motor 1,4 not only acts as an electric motor on being supplied with an electrical current, but also generates electricity by being driven by the engine 2 or by being driven by the running (coasting) energy of the vehicle.

It is possible to use a gasoline engine, a diesel engine or the like as an engine 2. The clutch 3 is a powder clutch which is Electro-magnetically controlled. The transmitted torque of the clutch can be freely regulated. It is possible to use a dry process single disc clutch or a wet process multiple disc clutch as the clutch 3. The transmission 5 can be, for example, a belt-type continuously variable transmission CVT which can continuously regulate the drive ratio. Furthermore it is possible to use a normal gear-type transmission as the transmission 5. The electric motor 1, the engine 2, the clutch 3, the electric motor 4 and the transmission 5 are respectively controlled by the control device 8–12. When an AC motor is used as the electric motor 1,4, an inverter is used in the electric motor control device 8,11 which converts the direct current of the high voltage battery 14 to an alternating current and supplies the electric motor 1,4 or charges the battery 14 by converting the generated alternating current of the electric motor 1,4 to a direct current. Furthermore when a DC motor is used as an electric motor 1,4, a DC/AC converter is used in the electric motor control device 8,11 which regulates the direct current of the high voltage battery 14 to a fixed voltage and supplies the electric motor 1,4 or regulates the generated direct current of the electric motor 1,4 to a fixed voltage and charges the high voltage battery 14. In either case, the electric motor control device 8,11 can control the output torque and rotation speed of the electric motor 1,4.

The engine control device 9 performs functions such as the control of fuel injection into the engine 2 and ignition control. The clutch control device 10 converts the exciting current of the powder clutch 3 and controls the transmitted torque. The transmission control device 12 controls the drive ratio of the transmission 5.

Figure 2:
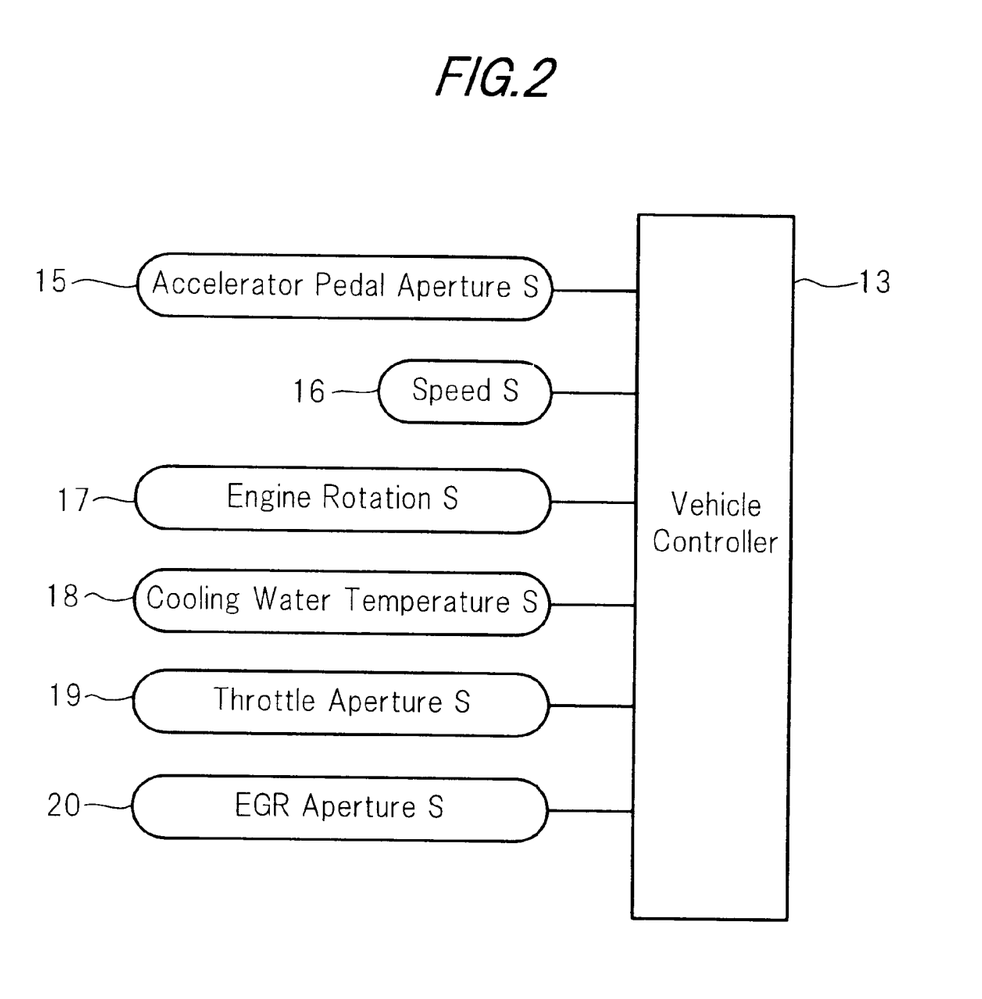
FIG. 2 is a block diagram of a control device.

The vehicle controller 13 comprises a microcomputer and related component parts and controls the control device 8–12 and the operation and function of the vehicle. As shown in FIG. 2, the following components input signals into the vehicle controller 13.

the accelerator pedal aperture sensor 15 which detects the degree of depression of the accelerator pedal, the vehicle speed sensor 16 which detects the running speed of the vehicle, the rev sensor 17 which detects the rotation speed of the engine 2, the temperature sensor 18 which detects the temperature of the cooling water in the engine 2, the throttle aperture sensor 19 which detects the degree of aperture of the throttle of the engine 2, and the EGR aperture sensor 20 which detects the degree of aperture of the EGR valve.

The vehicle controller 13 connects the clutch 3 when the accelerator pedal is depressed from a state in which the vehicle is being driven by the electric motor 4 at a low load and the vehicle is accelerated. As a result the vehicle is switched from running on the electric motor 4 and runs on the engine 2.

However if there is a difference between the torque output of the electric motor 4 and the torque output of the engine 2 at this time, a shock is generated by the connection. In the present invention, in order to avoid such shocks generated when switching, the engine 2 output, before being connected by the clutch 3, is made to correspond with the output of the electric motor 4. In addition all the torque generated by the engine 2 is absorbed by the electric motor 1. The electric motor 1 acts as a generator at that time so that the rotation speed of the engine corresponds with that of the electric motor 4. In this state, the sum of the generated output of the engine 2 and the electric motor 1 is zero. Hence in this state, even if the clutch is connected, since the output added to the electric motor 4 is zero, no shock is generated. In this way, if the clutch 3 is connected, after that time, control is performed so that the output of the electric motor 4 is zero. However at this time, in order to prevent the motive force of the vehicle from varying, it is preferable that the output of the electric motor 1 be controlled at the same time so that the sum of the output of the electric motors 1 and 4 is approximately zero.

Figure 3:
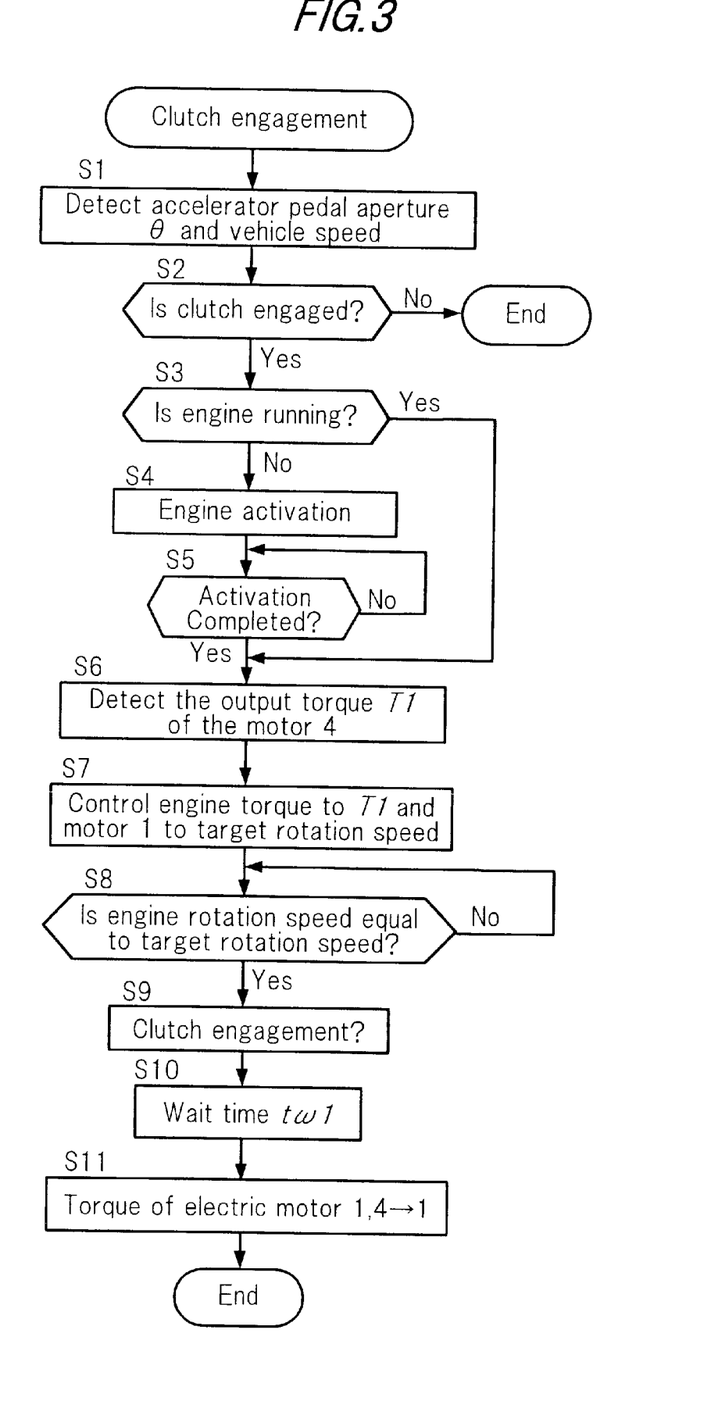
FIG. 3 is a flowchart showing a control program of when a clutch is engaged.
Figure 4:
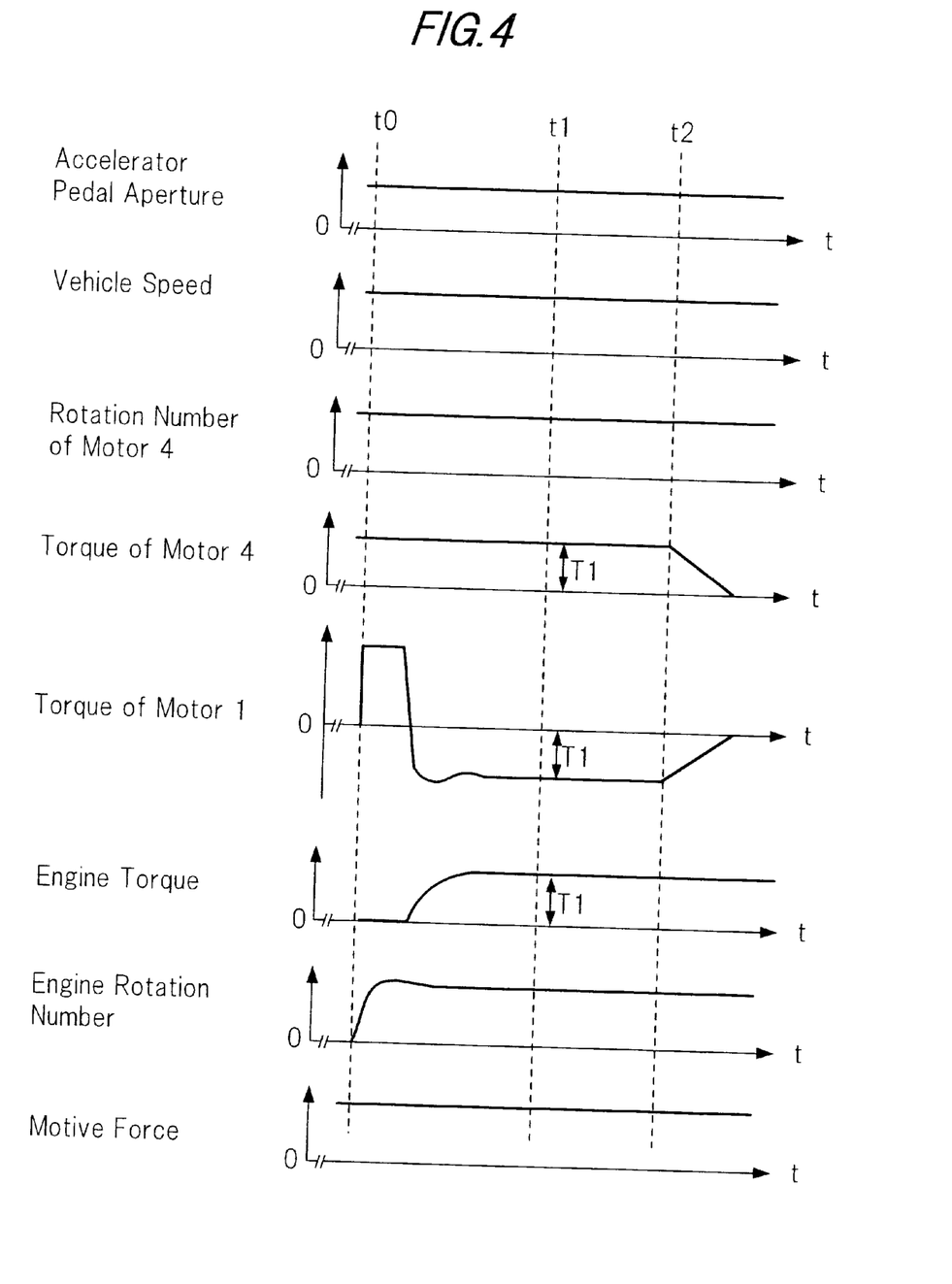
FIG. 4 shows the output of the engine and the electric motor when the clutch is connected during running at a moderate speed.
Figure 5:
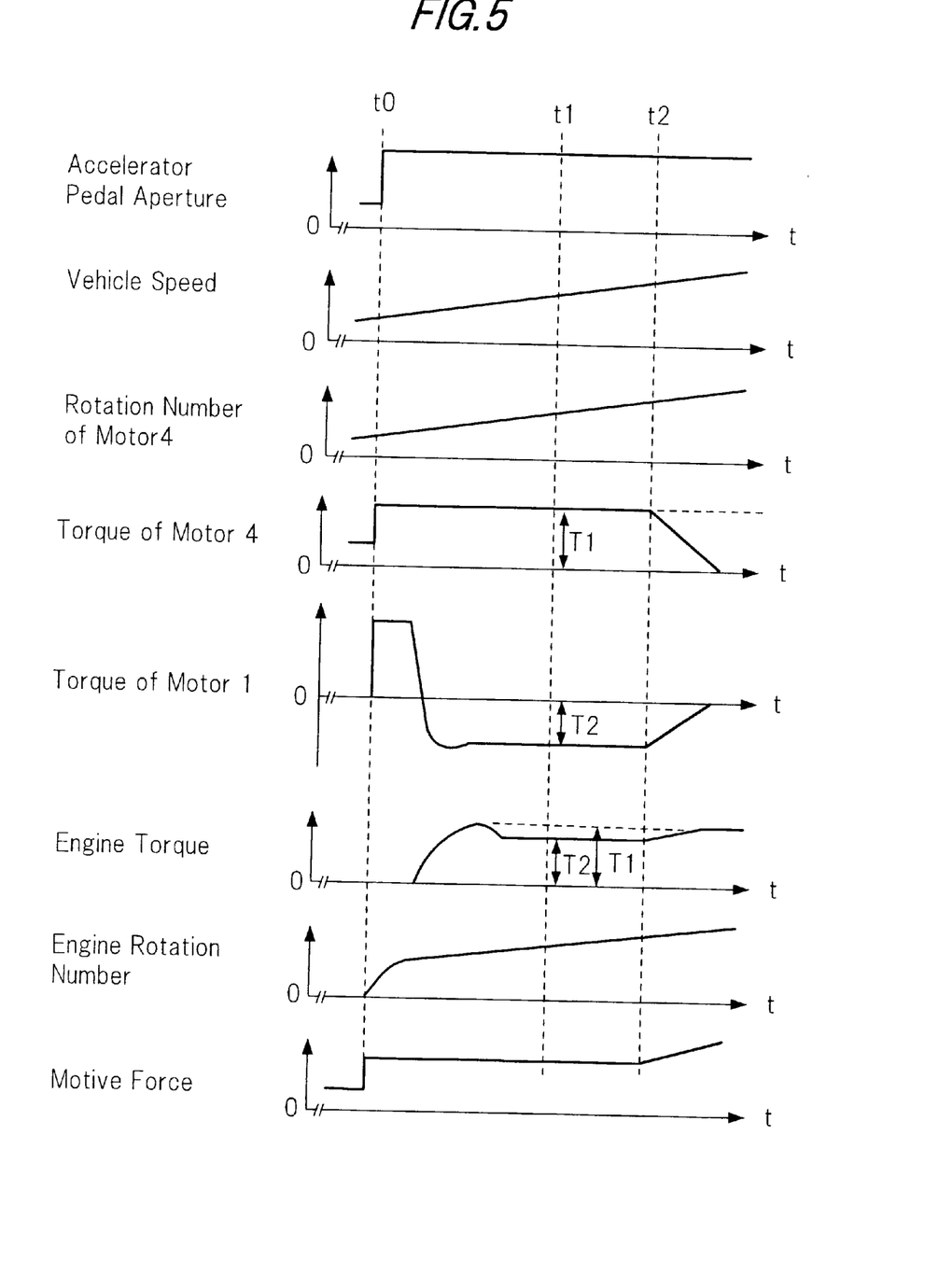
FIG. 5 shows the output of the engine and the electric motor when the clutch is engaged during sharp acceleration.

FIG. 3 is a flowchart showing the details of control. FIG. 4 shows the relationship between the output of the electric motor 1, 4 and the engine 2 when the clutch is connected at a time of moderate speed running. FIG. 5 shows the same relationship between the output of the electric motors 1, 4 and the engine 2 when the clutch is connected at a time of sharp acceleration.

The vehicle controller 13 executes the control program shown in FIG. 3 at fixed time intervals.

In a step 1, vehicle speed V and degree of accelerator pedal aperture θ are detected. In a next step 2, it is decided whether the vehicle is in a clutch connection region or not on the basis of the vehicle speed V and degree of accelerator pedal aperture θ.

Figure 6:
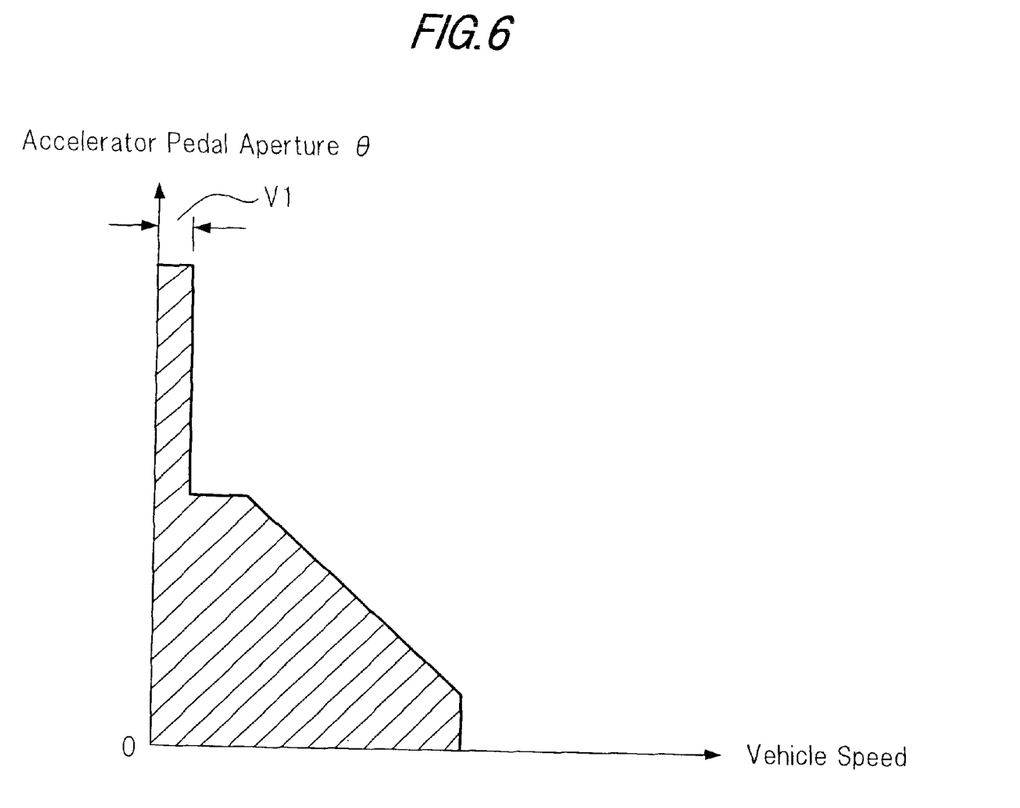
FIG. 6 shows an example of a clutch connection decision map.

FIG. 6 shows an example of a clutch connection decision map.

Basically at times of low speed and low load, the clutch 3 is released and the vehicle runs on the motive force of the electric motor 4. At times of high speed and high load, the motive force of the electric motor 4 and the engine 2 are switched by the clutch 3 so that the clutch 3 is connected and the vehicle runs on the motive force of the engine 2.

When the degree of accelerator pedal depression θ and the vehicle speed V are in the hatched region shown in FIG. 6, the clutch is disconnected. When these parameters leave the hatched area and enter the blank area, the clutch 3 is connected. However when vehicle speed V falls below a fixed value lower V1 for vehicle speed, since the engine rotation speed reduces and fuel efficiency and exhaust gas purification is lowered, the vehicle runs only on the motive force of the electric motor 4, even if the degree of accelerator pedal depression θ, which corresponds to the required motive force, is increased.

For example, the set value V1 mentioned above is set to a vehicle speed when the rotation speed of the engine is 200–300 [rpm].

If the decision is made to connect the clutch 3, the process enters steps past the step 3. If the clutch 3 is not connected, the process terminates. In a step 3, it is decided whether or not the engine 2 is running or not. This is determined on the basis that if the engine rotation number [rpm] is above a fixed value, the engine is deemed to be running. When the engine 2 is deemed to be stopped, the process continues onto a step 4 and activates the engine 2 (time t0 in FIGS. 4 and 5). The electric motor 1 is used as an activating electric motor to activate (cranking) the engine 2.

In a next step 5, the engine rotation at that time [rpm] is compared with a standard rotation speed to determine complete combustion and check whether or not the activation of the engine 2 is complete. If the rotation speed of the engine 2 is above a standard rotation speed, it is decided that the activation of the engine is complete and the process continues onto a step 6.

On the other hand, if the engine is already running in the step 3, the steps 4 and 5 are omitted and the process proceeds directly to the step 6.

In the step 6, the output torque T1 of the electric motor 4 is detected. Before the clutch 3 is connected, the output torque of the electric motor 4 reaches a value corresponding to the required motive output. When the clutch 3 is connected, it is necessary to raise the output torque of the engine 2 so as to be equal to the output torque of the electric motor 4. The output torque of the electric motor 4 can be calculated by detecting the magnetic flux and the electric current attributable to the torque of the motor and calculating the product of the two.

In a step 7, the rotational speed of the engine 2 is controlled so that it reaches a target rotational speed at the time the clutch 3 is connected while the output torque of the engine 2 is controlled to T1. The rotational speed at this time is controlled by using the electric motor 1 as a generator.

The output torque of the engine 2 is calculated from an output torque map corresponding to preset engine rotation speeds and throttle apertures. As a result, a throttle aperture command value is calculated corresponding to the present engine rotation speed and the necessary engine torque. A throttle actuator (not shown) is driven and the degree of throttle aperture is controlled so that it corresponds with that command value. In this way, the target output torque T1 is reached.

With respect to the target rotation speed of the engine 2 when the clutch 3 is connected, it is desirable that the rotation speed of the motor 4 before clutch connection, that is to say, the input shaft rotation speed of the clutch 3 be set to a rotation speed that is equal to the rotation speed of the output shaft.

When torque control is performed so that the output torque of the engine 2 is equal to the output torque T1 of the electric motor 4, the rotational speed of the engine 2 rises to a rotational speed which is proportional to the engine frictional torque at that level. Normally this is higher than the rotational speed of the electric motor 4 when the clutch is connected. Thus rotational speed is controlled by using the electric motor 1 as a generator so that the rotational speed of the engine 2 reaches a target rotational speed at the time of clutch connection. At that time, the output torque of the electric motor 1 reaches approximately -T1, that is to say, an equal value but opposite in sign to the output torque of the engine 2. The output torque of the engine 2 is absorbed by the electric motor 1 and the high voltage battery is charged by the generated current.

The characteristics of the rotation speed and output torque as discussed above, which take the throttle speed of the engine 2 as a parameter, vary due to driving conditions such as the external temperature or atmospheric pressure or due to secular variations such as friction. When there is a variation in the engine characteristics, the actual engine torque which is set based on a map as discussed above is different from the required motive force.

Hence when rotation speed control of the engine 2 is performed, the output torque of the electric motor 1, which is proportional with the output of the engine 2, is compared with the output of the engine 2. The output torque of the engine 2 is then corrected so that the difference in the absolute value of the two is zero. By such a means, even if the output characteristics of the engine 2 vary due to the driving conditions or secular variations, it is possible to make the output torque of the engine 2 correspond with the output torque T1 of the electric motor 4.

In a step 8, it is checked whether the rotational speed of the engine 2 has reached a target rotation speed or not. If the target rotation speed has been reached, it is decided that the conditions for connection of the clutch have been met and the process continues to step 9 and the clutch is connected (time t1 in FIGS. 4 and 5).

Since even if an exciting current is applied to a clutch 3, such as a powder clutch, there is a delay in the transmitted torque reaching a command value, in a step 10, waiting is performed for a fixed period tw1 after activating clutch connection.

When a fixed time has elapsed and the clutch connection is completed (time t2 in FIGS. 4 and 5), in a step 11, the output torque of the electric motor 1, 4 is slowly reduced to zero. At this time, the absolute value of the output torque of the electric motor 1, 4 is adjusted to be normally equal and the output of the electric motor 4 is used to generate electricity by the electric motor 1 and returned to the battery 14.

The overall operation will now be explained.

It is decided whether or not to connect the clutch 3 based on the detected value for vehicle speed V and the detected value for the accelerator pedal depression θ which determine the required motive force of the vehicle. When there is a change in the driving conditions, in order to switch from driving on the electric motor 4, with the clutch 3 not connected, to driving on the engine 2, when it is decided to connect the clutch 3, the output of the engine 2 is controlled so that the output torque of the engine 2 is equal to the output torque T1 of the electric motor 4. At this time, the electric motor 1 operates as an electrical generator to absorb the generated output of the engine 2 so that the rotation speed of the engine 2 corresponds to the rotation speed of the electric motor 4.

Thus after the output torque and rotation speed of the engine 2 correspond to a target value, the clutch 3 is connected. In this way, as shown in FIG. 4, the motive force of the vehicle before the clutch connection (before time t1) is the same as the motive force after clutch connection (after time t2). Hence there is no shock when the clutch is connected and good driving performance is achieved.

In this case, even if there is a discrepancy in operational characteristics due to the response speed of or deterioration of the clutch 3, there is no adverse effect on this process and it is possible to avoid a shock when the clutch is connected. Furthermore in addition to the fact that it is possible to eliminate a difference in the rotational speed of the input and output shafts at time of clutch connection, since it is possible to make the transmitted torque from the engine approximately zero when the clutch is connected, deterioration of the clutch is suppressed and the lifespan of the clutch is lengthened.

When the clutch 3 is connected, the outputs are varied in the same way until both are zero and the output of the electric motor 4 is absorbed with the electric motor 1. Hence there is no variation in the motive force of the vehicle when these components stop operating with the electric motor 1.

However when the clutch 3 is connected when the vehicle is undergoing high acceleration, the required output of the engine 2 (=the output of the electric motor 4) is too great and can not be absorbed by the electric motor 1. This is due to the fact that the electric motor 1 is mainly a generator and is not installed for the same purpose of driving the vehicle as the electric motor 4. Thus the maximum output of the electric motor 1 is small.

In this case, the output of the engine 2 is reduced until it reaches an output which can be absorbed by the electric motor 1. For example as shown in FIG. 5, when the vehicle is sharply accelerated by a large output torque T1 by the electric motor 4, when the engine 2 outputs a torque T1, the maximum rated torque T2 of the electric motor 1 is exceeded and can not be absorbed. Thus the output of the engine 2 is limited to the maximum rated torque T2 of the electric motor 1 so that the output of the engine 2 can be totally absorbed by the electric motor 1. If the clutch 3 is connected in this state, since the total value of the output of the engine 2 and the electric motor 1 is zero, no shock is generated and connection is performed. In this way, in the same way as the moderate acceleration shown in FIG. 4, the clutch is smoothly connected and clutch deterioration and friction is avoided.

When clutch connection is completed (time t2), the shortfall in the output of the engine 2 from the required value is slowly eliminated and the engine returns to the output torque T1 required for sharp acceleration.

On the other hand, the output of the electric motor 4 is reduced to zero in combination with the electric motor 1.

Methods of limiting (or reducing) the output of the engine 2 include reducing the throttle aperture, reducing the number of combustion cylinders, running on a lean burn air-fuel mixture and retarding ignition time. Retarding the ignition time is the method with the optimal responsiveness followed in order by air-fuel mixture regulation, regulating the number of cylinders and regulating the throttle aperture.

When accelerating sharply, after the clutch is connected and the motive force of the electric motor 4 is added to that of the engine 2 as a source of motive power for the vehicle, the output torque of the electric motor 4 is maintained as shown by the broken line in FIG. 5. However the output torque of the electric motor 1 is gradually reduced to zero.

In the embodiment discussed above, the discussion centered on the example of a power train in which the output shaft of the electric motor 1, the output shaft of the engine and the input shaft of the clutch 3 are mutually connected. Furthermore it relates to one in which the output shaft of the clutch 3, the output shaft of the electric motor 4 and the input shaft of the clutch 3 are mutually connected. Thus when the clutch is connected, the input shaft of the electric motor 1, the engine 2 and the clutch 3 are all equal to the rotation speed of the electric motor 4. Thus the output torque T1 of the electric motor 4 before clutch connection is detected and the output torque of the engine 2 is controlled to Ti. Also the engine rotation speed is controlled to meet the target rotation speed when the clutch is connected and the clutch 3 is connected.

However when the electric motor 1, the engine 2, the clutch 3 and the electric motor 4 are connected by a plurality of gears, when the clutch 3 is connected, the respective rotation speeds are not equal. Thus in this case, when the clutch is connected, output control is performed instead of the torque control outlined above. More precisely, an output F of the electric motor 4 before the clutch is connected is detected and the output of the engine 2 is controlled so that engine output reaches F Also the rotation speed of the engine 2 is controlled while the output of the engine 2 is absorbed by the electric motor 1 so that the input shaft rotation speed of the clutch 3 equals the output shaft rotation speed and the clutch 3 is connected.

When the rotation speed of the engine 2 is controlled to a target rotation speed, the engine output is corrected so that the difference between the output of the electric motor 1 and the output of the electric motor 4 is zero. In this case, the output of the electric motor can be calculated as the product of the torque and the rotation speed or the product of the motive voltage and the motive current. The output of the engine may be corrected by regulating the throttle aperture.

The present invention is not limited to the above embodiments and may be adapted to all types of hybrid vehicles which switch the output of an electric motor and an engine substantially through a clutch on the basis of driving conditions. The technical scope of the invention as set out in the claims covers all variations within the understanding of the person skilled in the art.

What is claimed is:

1. A control device for a hybrid vehicle which comprises:
   an engine,
   a first electric motor connected to said engine,
   a second electric motor connected through a clutch to said engine,
   a transmission which transmits a motive force to a drive system and which is connected to said second electric motor,
   a microprocessor which is programmed to decide whether or not to connect said clutch on the basis of driving conditions, to detect a required motive force of said vehicle, and to limit an output of said engine to meet said required motive force, wherein
   said microprocessor is further programmed to control switching so as to control said engine so that an output of said engine outputs said required motive force when it is determined to connect said clutch,
   to control said first motor so that an output of said engine is kept at said required motive force and a rotation speed reaches a target rotation speed when it is determined to connect said clutch, and
   to control said clutch so that said clutch is connected after said engine rotation speed corresponds with a target rotation speed.

2. A control device for a hybrid vehicle as defined in claim 1 wherein the target rotation speed of said engine is equal to a rotation speed of an output shaft of said clutch before said clutch is connected.

3. A control device for a hybrid vehicle as defined in claim 1 wherein said microprocessor is further programmed to control switching so that an output of said first electric motor is slowly reduced to zero after said clutch is connected.

4. A control device for a hybrid vehicle as defined in claim 3 wherein said microprocessor is further programmed to control switching so that a sum of an output of said first electric motor and an output of said second electric motor is slowly reduced to zero after said clutch is connected.

5. A control device for a hybrid vehicle as defined in claim 1 wherein said microprocessor is further programmed to control switching so that when a required motive force exceeds a maximum output of said first electric motor after said clutch is connected, an output of said engine before said clutch is connected is limited to the maximum output of said first electric motor and an output of said engine, after completion of connection of said clutch, is slowly raised to said required motive force.

6. A control device for a hybrid vehicle as defined in claim 5 wherein said microprocessor is further programmed to control switching so that when said required motive force after connection of said clutch is greater than the maximum output of said engine at that rotation speed, an output of said first electric motor, after connection of said clutch, is slowly reduced to zero, and an output of said second electric motor is maintained.

7. A control device for a hybrid vehicle as defined in claim 1 wherein said microprocessor is further programmed to control switching so that when a rotation speed of said engine is controlled to a target rotation speed, an output of said engine is corrected depending on a deviation of an output of said second electric motor and an output of said first electric motor.

8. A control device for a hybrid vehicle as defined in claim 1 wherein said microprocessor is further programmed to control switching so that when said engine is stopped at the time of clutch connection decision, an output of said engine is raised to said required motive force after said engine is activated by said first electric motor.

9. A hybrid vehicle which comprises:
   an engine,
   a first electric motor connected to said engine,
   a second electric motor connected through a clutch to said engine,
   a transmission which transmits a motive force to a drive system and which is connected to said second electric motor,
   a microprocessor which is programmed to decide whether or not to connect said clutch on the basis of driving conditions, to detect a required motive force of said vehicle, and to limit an output of said engine to meet said required motive force, wherein
   said microprocessor is further programmed to control switching so as to control said engine so that an output of said engine outputs said required motive force when it is determined to connect said clutch,
   to control said first motor so that an output of said engine is kept at said required motive force and a rotation speed reaches a target rotation speed when it is determined to connect said clutch, and
   to control said clutch so that said clutch is connected after said engine rotation speed corresponds with a target rotation speed.

10. A control device for a hybrid vehicle, comprising:

an engine, a first electric motor connected directly to said engine, a second electric motor connected through a clutch to said engine, a transmission which transmits a motive force to a drive system and which is connected to said second electric motor, a microprocessor which is programmed to decide whether or not to connect said clutch on the basis of driving conditions, to detect a required motive force of said vehicle, and to limit an output of said engine to meet said required motive force, wherein said microprocessor is further programmed to control switching so as to control said engine so that an output of said engine outputs said required motive force when it is determined to connect said clutch, to control said first motor so that an output of said engine is absorbed and a rotation speed reaches a target rotation speed when it is determined to connect said clutch, and to control said clutch so that said clutch is connected after said engine rotation speed corresponds with a target rotation speed.

11. A control device for a hybrid vehicle as claimed in claim 1, wherein said microprocessor is further programmed to control said clutch so that said clutch connects after a combined output torque of said engine and said first motor is about zero.

12. A control device for a hybrid vehicle as claimed in claim 1, wherein said microprocessor is further programmed to control said clutch so that said clutch connects after a torque absorbed by the first motor is about equal to a torque outputted by the second motor.

13. A control device for a hybrid vehicle as claimed in claim 11, wherein said microprocessor is further programmed to control switching after the clutch is connected so that individual outputs of said first and second motors are slowly reduced to zero while controlling a combined torque of the first and second motors to remain about zero.

* * * * *